UNITED STATES PATENT OFFICE.

PHILIP ADOLPH KOBER, OF ALBANY, NEW YORK, ASSIGNOR TO E. R. SQUIBB & SONS, OF NEW YORK, N. Y., A CORPORATION OF NEW YORK.

PROCESS OF MAKING PRIMARY ARSANILIC ACID.

1,405,228.  Specification of Letters Patent.  Patented Jan. 31, 1922.

No Drawing.  Application filed November 18, 1918. Serial No. 262,924.

*To all whom it may concern:*

Be it known that PHILIP ADOLPH KOBER, a citizen of the United States, and of Albany, county of Albany, and State of New York, has invented certain new and useful Improvements in Process of Making Primary Arsanilic Acid, of which the following is a specification.

This invention relates to improvements in the manufacture of primary arsanilic acid, or otherwise known as p-amino-phenyl arsonic acid, which as the sodium salt has been known as atoxyl for many years. (See Ehrlich and Bertheim, Berichte der deutschen chemischen Gesellschaft, 40, 3292, (1907).) It finds usefulness in medicine and in the manufacture of arsphenamine (salvarsan).

These authors, as well as many others including G. T. Morgan, in his book on "Organic Compounds of Arsenic and Antimony," Longmans publishers, (1918), pages 64 and 154, mention that Béchamp (Comp. rend, LVI, 1172, 1863) was the first to prepare this substance. In neither Béchamp's article or in subsequent publications, such as Benda and Kahn (Berichte der deut. chem. Gesell., 41, 1672, 2367, 1908) and Pyman and Reynolds (Transactions of the Journal of the Chem. Society (London), 93, 1184, 1908) are the disclosures sufficiently accurate and definite to give primary arsanilic acid in substantial yields, without having arsanilic acid (secondary) i. e., di-p-aminophenyl-arsinic acid as a by-product (see literature cited above). When the secondary arsanilic acid is present with the primary as is admittedly the case heretofore, it requires considerable time, material and expense to eliminate the secondary.

Now I have discovered that the cause of all these poor yields and the cause of the contamination of the product with secondary arsanilic acid is due to (1) the use of too much aniline, or to excess aniline, (2) too high a temperature. When these two factors are controlled, one obtains large yields of primary arsanilic acid free from secondary and practically free from coloring matter. Furthermore, it is not necessary to concentrate any liquors in vacuo or otherwise, nor to decolorize with charcoal or any other means nor to distill off any aniline oil with steam or any other means.

The explanation for the method here disclosed follows from inspection of the reaction supposedly involved.

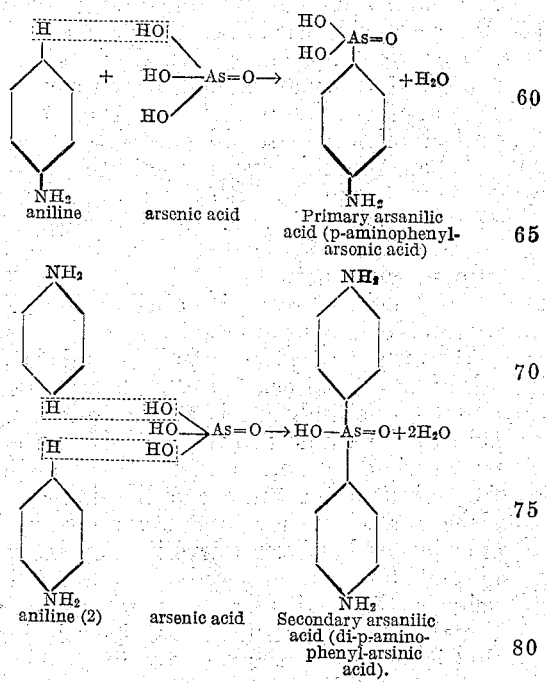

As may be seen two molecules of aniline are necessary to make the secondary arsanilic acid, and as I found, one can carry out the reaction with less than two molecules so that its formation as a by-product is hindered or absolutely prevented. This is contrary to all recorded directions. Furthermore, my experiments show that below 180° C. or thereabouts, even if two molecules of aniline are present for one of arsenic acid, that the formation of the secondary arsanilic acid does not take place to any extent, while the formation of the primary arsanilic acid does go on to a considerable extent.

By using one or both of these schemes, the primary arsanilic acid can be made easily and cheaply.

To carry out this invention, I prefer to go about it as follows:

One thousand cc. (about 1880 g.) of arsenic acid (containing 76% arsenic acid) are heated in an open beaker or vessel, at 120° to 140° C. for 12 to 15 hours, by means of an oil or "Crisco" bath. This concentrates the acid to practically 100% arsenic acid.

Fourteen hundred cc. (about 1400 g.) of aniline oil are cooled with an ice mixture to 0° C. or lower, and the cooled arsenic acid is added, slowly, with vigorous stirring. The mixture soon becomes thick and then granular, after which it is finely ground and thoroughly mixed. This powder has roughly the composition of $(C_6H_5NH_2)_3(H_3AsO_4)_2$.

Two hundred (200) grams of this powder are heated in an Erlenmeyer flask, by means of a "Crisco" bath to 160° C. when the powder begins to melt. The substance is stirred continually and when it has all melted, a reflux condenser is then attached; for one and a half hours it is heated from 160°–170°, and then 1 hour from 180° to 185° C. After allowing the mixture to cool somewhat 225 cc. of 6 normal sodium hydroxide and 225 cc. of water are added, which causes the substance to dissolve and separates out the aniline oil left uncombined.

When the mixture is cool, the aqueous layer is drawn off, with the aid of a separatory funnel, and after shaking with 15 to 20 grains of infusorial earth or kaolin, it is filtered with suction.

To the clear filtrate is added 100 cc. of 6N hydrochloric acid.

By means of 25 cc. portions and further additions of 0.5 cc., 1.0 cc., 2.00 cc., etc. of 6NHCl, one finds out if further addition of acid to the whole filtrate will give an additional yield or not. When after waiting a few minutes for the crystallization to take place, and when the proper amount of hydrochloric acid has been determined on the small aliquot portion, an equivalent amount of acid is then added to the whole filtrate. Usually the crystals fill the entire solution so that it has the appearance of being solid.

After standing for an hour or longer, the precipitate, which is white and crystalline, is filtered with suction. It is then washed by suspending the precipitate in 200 cc. of water and filtering with suction. When all of the wash liquid has drained from the precipitate, it is dried by fanning, or in any other suitable way. The yield is from 20 to 30% of the theory.

The product obtained by the above directions can, if necessary, be further purified by reprecipitation with alkali and acid, or by dissolving it in boiling water and allowing the same to cool.

The analysis of a crude product once purified by hot water crystallization and dried in a vacuum desiccator gave:

|  | As% | N% |
|---|---|---|
| Product | 34.20 | 6.02 |
| Product | 34.50 | 6.13 |
| Theory for primary acid | 34.60 | 6.45 |
| Theory for secondary acid | 25.65 | 9.65 |

What is claimed is:

1. The process of making primary arsanilic acid without the simultaneous production of any appreciable amount of secondary arsanilic acid which comprises heating a mixture of about 3 to 4 molecular proportions of aniline and 2 molecular proportions of arsanic acid first to a temperature of 160° to 170° C., and later at a temperature from 180° to 185° C.

2. The process of making primary arsanilic acid which comprises heating about 3 molecular proportions of aniline and 2 molecular proportions of arsenic acid to a temperature which does not exceed about 185° C.

3. The process of making primary arsanilic acid without the simultaneous production of any appreciable amount of secondary arsanilic acid which comprises heating a mixture of about 3 to 4 molecular proportions of aniline and 2 molecular proportions of arsenic acid first to a temperature of 160° to 170° C., for about 1½ hours and later at a temperature from 180 to 185° C., for about 1 hour.

Signed at Albany, in the county of Albany, and the State of New York, this 14th day of November, 1918.

PHILIP ADOLPH KOBER.